US006256476B1

(12) United States Patent
Beamish et al.

(10) Patent No.: US 6,256,476 B1
(45) Date of Patent: Jul. 3, 2001

(54) POWER MANAGEMENT FOR A TELEPHONE SYSTEM BY DYNAMICALLY ADJUSTING TRANSMISSION POWER

(75) Inventors: Norman J. Beamish, Costa Mesa; John S. Walley, Lake Forest, both of CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/104,732

(22) Filed: Jun. 25, 1998

(51) Int. Cl.$^7$ ...................................................... H04Q 7/20
(52) U.S. Cl. ........................... 455/38.3; 455/574; 455/522
(58) Field of Search ..................................... 455/522, 571, 455/572, 573, 574, 575, 69, 38.3, 343, 68; 370/252, 311, 349

(56) References Cited

U.S. PATENT DOCUMENTS

| | | |
|---|---|---|
| 4,580,262 | 4/1986 | Naylor et al. . |
| 4,613,990 * | 9/1986 | Halpern ................................... 455/69 |
| 5,003,619 * | 3/1991 | Morris et al. .......................... 455/343 |
| 5,220,678 | 6/1993 | Feei . |
| 5,228,026 | 7/1993 | Albrow et al. . |
| 5,265,119 * | 11/1993 | Gilhousen et al. ................. 455/38.3 |
| 5,333,175 | 7/1994 | Ariyavisitakul et al. . |
| 5,351,041 * | 9/1994 | Ikata et al. ............................ 455/343 |
| 5,528,623 * | 6/1996 | Foster, Jr. ............................. 375/202 |
| 5,551,057 * | 8/1996 | Mitra ....................................... 455/69 |
| 5,564,074 | 10/1996 | Juntti . |
| 5,566,165 * | 10/1996 | Sawahashi et al. .................. 455/38.3 |
| 5,579,373 * | 11/1996 | Jang ..................................... 455/38.3 |
| 5,644,594 * | 7/1997 | Johnson et al. ....................... 455/343 |
| 5,710,981 * | 1/1998 | Kim et al. ............................. 455/127 |
| 5,831,545 * | 11/1998 | Murray et al. ..................... 340/825.4 |
| 5,844,935 * | 12/1998 | Shoji ..................................... 375/200 |
| 5,924,043 * | 7/1999 | Takano ................................. 455/522 |
| 6,002,942 * | 12/1999 | Park ..................................... 455/522 |
| 6,067,458 * | 5/2000 | Chen ..................................... 455/522 |

* cited by examiner

Primary Examiner—Dwayne Bost
Assistant Examiner—Jean A. Gelin
(74) Attorney, Agent, or Firm—Knobbe, Martens, Olson & Bear, LLP

(57) ABSTRACT

A power management system for a mobile unit wherein the base station detects the quality of the signals transmitted by the mobile unit. Based on this signal quality, the base station determines if the mobile unit should increase the transmission power level. If an increase in transmission power is indicated, the base station sends a signal to the mobile unit to cause the mobile unit to increase transmission power. However, to save battery power, the mobile unit only transmits at the increased power level for a limited amount of time, and then automatically returns to transmitting at the lower power level. Further, a slightly decreased high power level is established to allow the mobile unit to function when it is located away from the base station, yet not near the outer transmission boundary.

23 Claims, 8 Drawing Sheets

SLOW POWER CONTROL

FAST POWER CONTROL

POWER MANAGEMENT FOR A TELEPHONE SYSTEM BY DYNAMICALLY ADJUSTING TRANSMISSION POWER

BACKGROUND

1. Field of the Invention

This invention relates to the field of wireless communication systems. More specifically, the present invention relates to power management by dynamically adjusting the transmission power of mobile stations based upon the quality of received signals by the base station.

2. Background

The use of wireless communication systems is growing with users now numbering well into the millions. One of the most popular wireless communications systems is the cordless telephone, consisting of a mobile unit (or handset) and a base station. Cordless telephones allow a user to talk over the telephone without having to remain in a fixed location. This allows users to, for example, move freely about a house while talking on the phone. However, one inconvenience associated with routine use of a cordless telephone is the constant need to recharge and replace depleted batteries in the handset.

As with any transmitted signal, the quality of the received signals varies based upon a number of factors, including atmospheric conditions, location of the mobile unit, or interference by walls or buildings. If a signal transmitted by the mobile unit has degraded, the base station may be unable to decode and process the signal. This may occur, for example, if the mobile unit is at the outer transmission boundary of the base station.

The power required by the mobile unit to transmit signals to the base station is one of the largest drains on battery power. In an attempt to extend battery life, mobile units are designed to vary the amount of transmission power based upon current needs. For example, a mobile unit located a long distance from the base station needs to transmit signals at a higher power level than a mobile unit near the base station. Current systems adjust the transmission power of the mobile unit based upon signal quality measurements taken over an extended period of time. Once the average signal quality diminishes below a set level, the mobile unit begins transmitting signals at a higher power level. After switching to the higher power level, the signal quality is again measured. If these signal quality measurements are above a threshold for an extended period of time, the base station instructs the mobile unit to switch to a lower power level to conserve battery power. While adjusting the transmission power levels of the mobile unit over extended periods of time has improved battery life, there is always a desire to further extend the useful life of the battery.

Improvements in battery technology, while helpful, have done little to avoid the seemingly ever-present need to recharge and replace mobile unit batteries. What is needed is a system to further conserve battery power by reducing the power consumed by the mobile unit.

SUMMARY

The present invention is directed to reducing power consumed by a mobile unit. The present invention recognizes the largest amount of battery power is consumed during the highest transmission power level of the mobile unit. Therefore, the present invention is directed to minimizing the amount of time the mobile unit transmits at the highest power level.

In one embodiment of the present invention, the base station detects the quality of the signals transmitted by the mobile unit. Based on this signal quality, the base station determines if the mobile unit should increase the transmission power level. If an increase in transmission power is indicated, the base station sends a signal to the mobile unit causing the mobile unit to increase transmission power. However, to save battery power, the mobile unit transmits at the increased power level for a limited amount of time, and then automatically returns to transmitting at the lower power level.

The present invention also recognizes that in certain circumstances, mobile units can transmit at a high power level for long periods of time. By transmitting at a high power level, the mobile unit can function at the outer transmission boundary of the base station. However, the mobile unit often transmits at a high power level without being at the outer transmission boundary. In these situations, where the mobile unit is located away from the base station, yet not near the outer transmission boundary, the highest power level is not necessary. Therefore, the present invention allows the mobile unit to operate at a reduced high power level during these periods.

One embodiment of the invention is a wireless communication system comprising a base station which transmits a first plurality of signals and receives a second plurality of signals. A signal strength detector in the base station determines the quality of at least some of the second plurality of signals received by the base station. When the quality of the signals is below a predetermined threshold, the base station inserts a low power indicator in at least one of the first plurality of signals transmitted by the base station. A mobile unit receives the first plurality of signals transmitted by the base station. The mobile unit is configured to operate at either a first power level or a second power level, where the first power level is higher than the second power level. When the mobile unit receives the low power indicator from the base station, the mobile unit operates at the first power level and after the transmission of a signal, the mobile unit resets to operate at the second power level.

Another embodiment of the invention is a wireless communication unit comprising a receiver configured to receive a first plurality of signals, at least one of the first plurality of signals having a power level command. A transmitter is configured to transmit a second plurality of signals over at least two power levels, where a first power level is greater than a second power level. A processor is connected to the receiver and the transmitter. The processor is configured to control the transmitter so as to vary the power levels of the second plurality of signals. The processor is further configured to select the first power level in response to the power level command and then select the second power level after the transmission of the second plurality of signals.

Another embodiment of the invention is a method of conserving power in a wireless communication system comprising the acts of determining the quality of a first signal received from the mobile unit and comparing the received signal quality to a predetermined value. A second signal is then transmitted from the mobile unit at a first power level when the received signal quality is below the predetermined value. The mobile unit automatically resets to transmit at a second power level following a transmission at a first power level, where the first power level is higher than the second power level.

Another embodiment of the invention is a wireless communication system comprising a signal strength indicator which determines the quality of a signal received from a mobile unit and a power level adjustor which increases the power level of a signal transmitted by the mobile unit for only a predetermined number of transmissions when the signal quality is below a set value.

Another embodiment of the invention is a method of saving power in a communications system which provides for the repeated exchange of signals between a first location and a second location. The method comprises the acts of determining the quality of a first signal transmitted by the first location and transmitting information instructing the first location to increase the transmission power for a second signal to a first power level if the quality of the first signal falls below a predetermined level. The method then resets the transmission power of the first location to a second power level after transmission of the second signal, where the first power level is higher than the second power level. The method then determines the quality of the second signal transmitted by the first location and transmits information instructing the first location to increase the transmission power for a third signal to a first power level if the quality of the second signal falls below a predetermined level.

Another embodiment of the invention is a wireless communication system comprising means for determining the quality of a signal received, means for indicating when the quality of the signal falls below a threshold, and means for increasing the signal transmission power for only a predetermined number of transmissions when the indication means is detected.

BRIEF DESCRIPTION OF THE DRAWINGS

These and other features and advantages of the invention will become more apparent upon reading the following detailed description and upon reference to the accompanying drawings.

DETAILED DESCRIPTION

Figure 1:
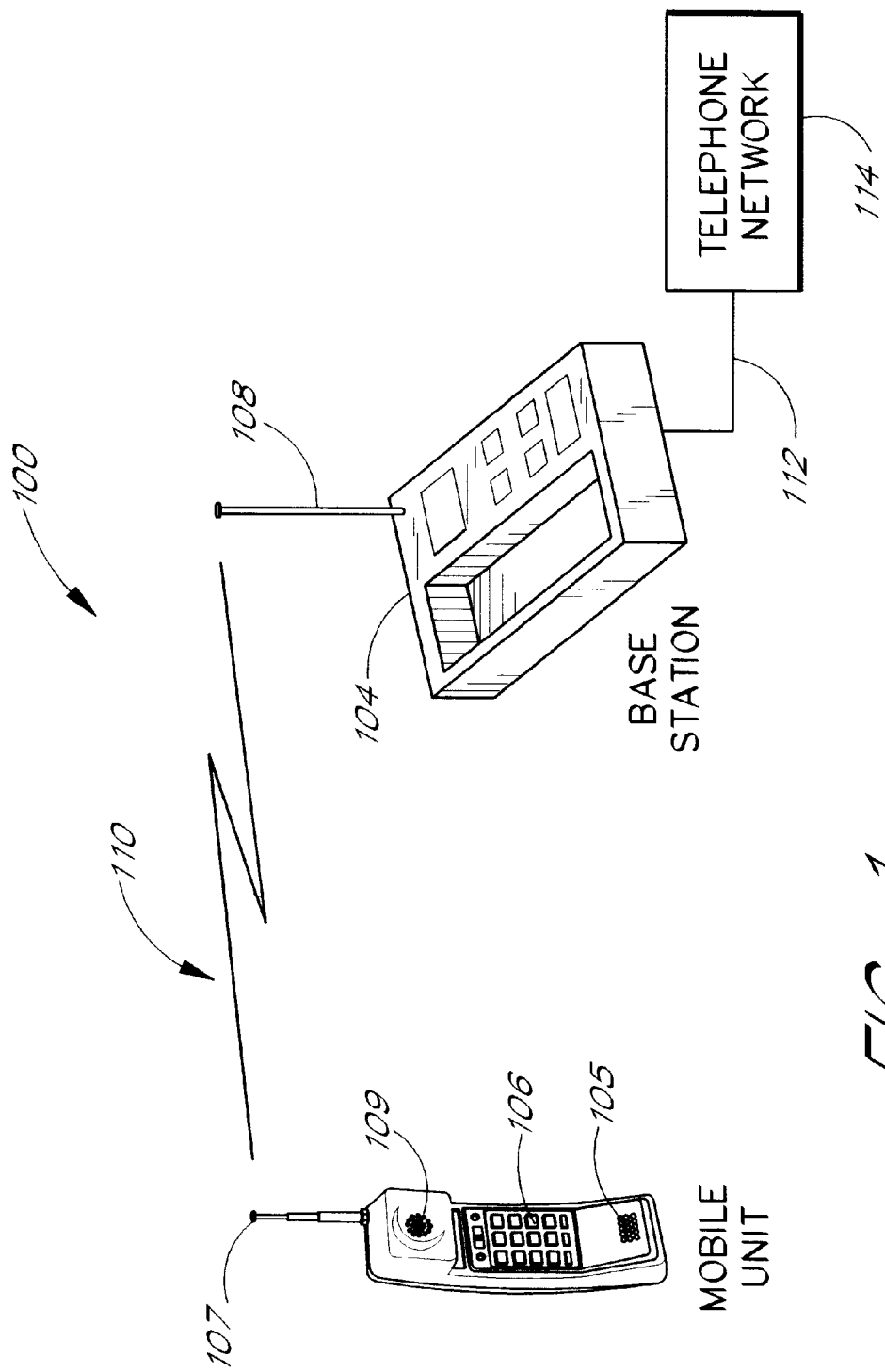
FIG. 1 illustrates components of a remote telephone system appropriate for use with one embodiment of the present invention.

A remote telephone system 100 appropriate for use with one embodiment of the invention is shown in FIG. 1. The remote telephone system 100 contains a base station 104 and a mobile unit 106. An antenna 108 on the base station 104 transmits signals 110 to and from an antenna 107 on the mobile unit 106. The base station 104 is connected to a land-base telephone network 114 via a connection 112. Of course, other methods of connecting the base station 104 to the land-base telephone network 114, such as wireless connections, may be used.

In operation, the mobile unit 106 monitors signals 110 from the base station 104 to determine if a call is pending. If a call is pending, the mobile unit 106 switches to a communications mode. In the communications mode, a user speaks into a microphone 105. The speaking is then encoded at the mobile unit 106 and transmitted to the base station 104. This data is eventually transmitted over the telephone network 114. Information received via the telephone network 114 is transmitted along the connection 112 to the base station 104 for transmission to the mobile unit 106. At the mobile unit 106, the signal 110 is received, decoded and played to the user through a speaker 109.

Figure 2:
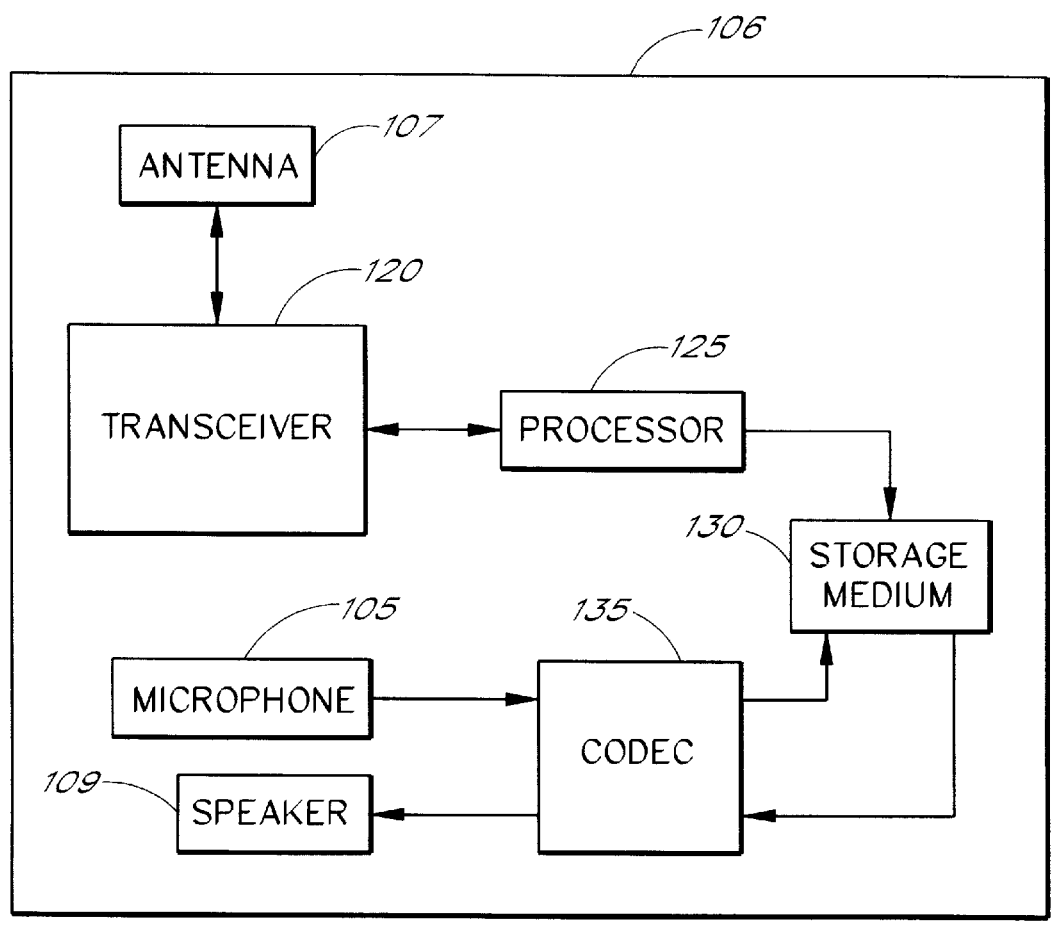
FIG. 2 illustrates a block diagram of a mobile unit according to one embodiment of the present invention.

FIG. 2 illustrates one embodiment of a mobile unit 106 according to one embodiment of the present invention. The mobile unit 106 downlinks the signals from the base station 104 at a transceiver 120 via an antenna 107. The transceiver 120 may also uplink information to the base station 104. Alternatively, a separate receiver and transmitter may be used in place of the transceiver 120. After receiving the signals, the transceiver 120 relays the signals to a processor 125. In one embodiment, a microprocessor performs the function of the processor 125. Of course, other types of processors may be used including conventional general purpose single-chip or multi-chip microprocessors, digital signal processors, embedded microprocessors, microcontrollers and the like.

The processor 125 converts the signals into data and performs the functions requested by the signal. This may include an indication that a call is pending. The mobile unit 106 may inform the user of a pending call by a variety of methods, including ringing, vibrating or flashing lights. During the pendency of a call, the data transmitted and received by the mobile unit 106 may include voice and data.

The data created by the processor 125 may be temporarily or permanently stored in a storage medium 130. The storage medium 130 may comprise any method of storing information. For example, the storage medium 130 may comprise an electrically erasable programmable read-only memory (EEPROM), read-only memory (ROM), random access memory (RAM), hard disks, floppy disks, laser disc players, digital video devices, compact discs, video tapes, audio tapes, magnetic recording tracks, and other techniques to store data.

The data from the storage medium 130 may be transmitted through a codec (coder/decoder) 135 to the speaker 109. The codec 135 may comprise a digital-to-analog converter or the like. The decoded data may then be played through the speaker 109 to be heard by the user.

The user may also direct voice into the microphone 105 of the mobile unit 106. The voice data passes through the codec 135 and may be stored by the storage medium 130 prior to processing by the processor 125. The codec 135 may comprise an analog-to-digital converter or the like. The processor 125 maintains two-way communication with the transceiver 120, and therefore the voice data may be sent from the mobile unit 106 to the base station 104.

Figure 3:
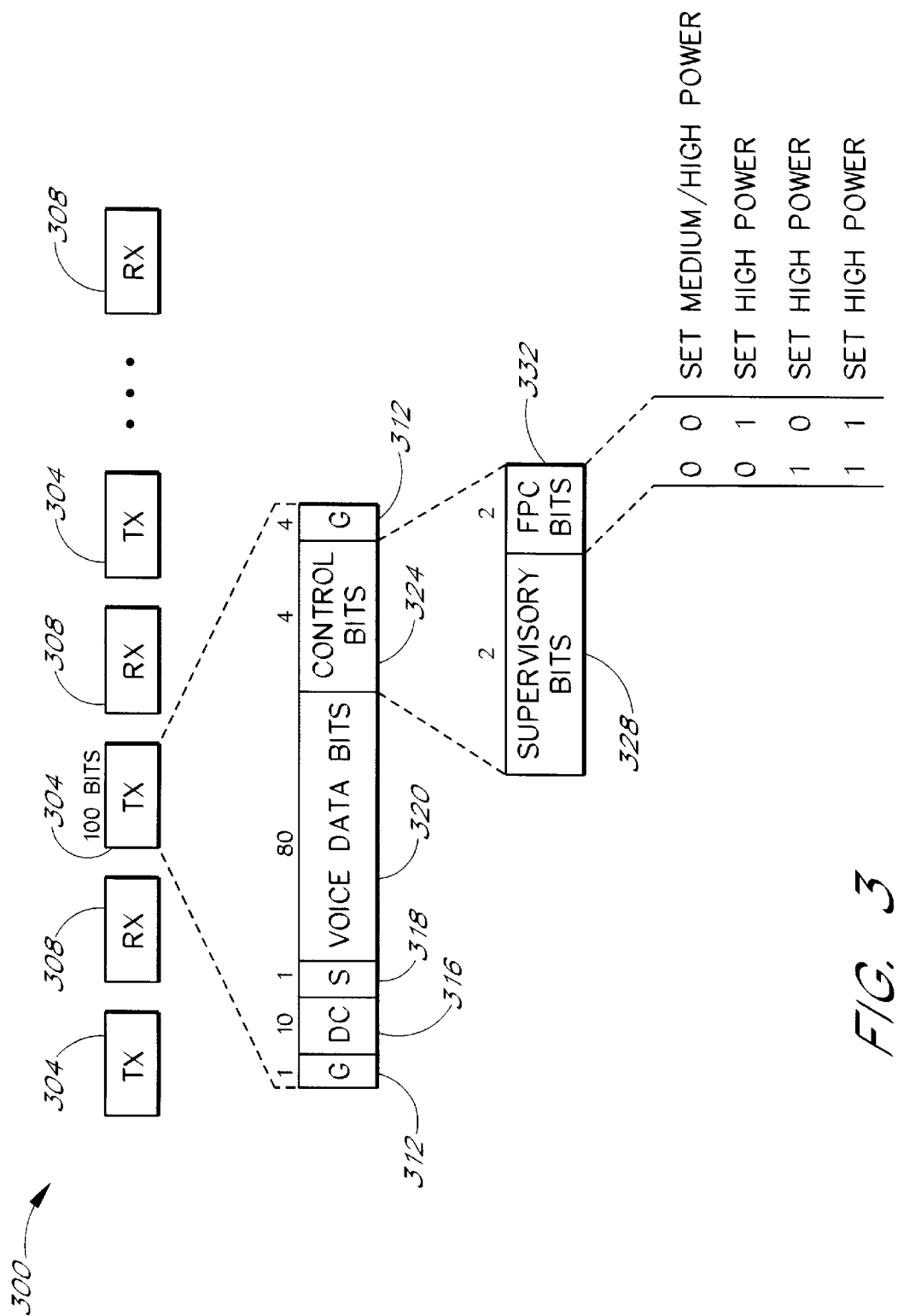
FIG. 3 illustrates an example of wireless communication signal data transmitted by a base station and a mobile unit.

FIG. 3 illustrates wireless communication signal data transmitted by a base station 104 in structural data frames, sometimes called time division duplex (TDD) frames. Time division duplex is a type of multiplexing where two or more transceivers transmit and receive on the same frequency, but never at the same time. This kind of duplex operation is called half-duplex operation. Of course, the invention is not limited to time division duplex systems or time division duplex frames, and may include systems using code division multiple access, statistical time division multiplexing, spread spectrum, single communication channels, global system for mobile communications standards, or the like. For ease of understanding, the present invention will be described with reference to a time division duplex base system.

The time division duplex system provides for a series of data frames 300 divided into transmission frames 304 and receiving frames 308 sent between the base station 104 and mobile unit 106. Each of the transmission frames 304 and receiving frames 308 has a duration of approximately one millisecond. Although the time division duplex system operates in a half-duplex mode, the one millisecond frame length allows the time division duplex system to appear to be a full duplex operation to the user. The time division duplex operations are performed by the transceiver 120 and the processor 125, according to common techniques known to those of skill in the art.

Each of the transmission frames 304 and the receiving frames 308 contains 100 bits of data. In one embodiment, the composition of the bits of data are the same in both the transmission frames 304 and receiving frames 308. Thus, the composition of the bits will be described in reference to one of the transmission frames 304. The 100 bits of data in a single transmission frame 304 are allocated as follows: 5 guard bits 312, 10 settling bits 316, 1 differential decoder start bit 318, 80 voice data bits 320, and 4 control bits 324.

The guard bits 312 are divided into two sets of bits, one bit at the beginning of the data frame and 4 bits at the end of the data frame. The guard bits 312 at each end of the data frame allow for an isolation of each frame in time to ensure proper reading of the bits in case of frame overlap. The settling bits 316 represents a period of time during which the mobile unit 106 ramps up radio frequency (RF) power. The decoder start bit 318 initializes the codec 135.

The actual conversation or speaking is contained in the 80 voice data bits 320. These are the data bits that have been encoded by the codec 135 of FIG. 2. The actual coding and decoding of the voice data bits 320 use techniques which are well known to one of skill in the art. The 80 voice data bits 320 are decoded by the codec 135 of the receiving unit to be played through the speaker 109.

The remaining 4 bits of data in the transmission frame 304 are control bits 324. Two of these bits comprise the supervisory control bits 328 which contain basic controlling information, including, among other things, the slow power control data, channel hopping sequences, ring requests, and other control information. In one embodiment, the remaining two bits are the fast power control bits 332. The fast power control bits 332 convey information to the mobile unit 106 as to what power level to transmit in. Further details of the operation and identification of the fast power control bits 332 will be discussed below.

In one embodiment, the fast power control bits 332 have four possible values which are shown in FIG. 3. Of course, it is possible to use one bit, having two possible values, for the fast power control. However, two bits are used in one embodiment to ensure a single bit error does not thwart an instruction to increase power. Using two fast power control bits 322, when both bits have a value of zero, the mobile unit 106 is instructed to transmit at the medium/high power level. When bit 1 has a value of 1 and bit 2 has a value of 0, or bit 1 has a value of 0 and bit 2 has a value of 1, or both bits 1 and 2 have a value of 0, the mobile unit 106 is instructed to transmit at the high power level. Therefore, if either bit 1 or bit 2 is set to 1, the mobile unit 106 operates at the high power level.

Figure 4A:
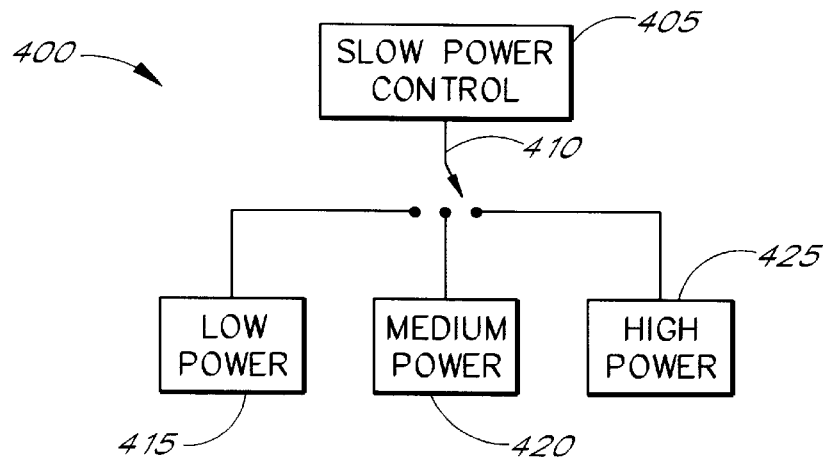
FIG. 4A illustrates a block diagram of the slow power control used by existing wireless communication systems.

FIG. 4A is a block diagram 400 showing the operation of a slow power control 405 used in some current wireless systems. The slow power control 405 is a software control system operated by the base station 104. The block diagram 400 of FIG. 4A is an illustration of the slow power control 405 as it functions in the base station 104. The slow power control 405 instructs the transceiver 120 of the mobile unit 106 at which power level to transmit the transmission frames 304.

Using a software switch 410, the slow power control 405 selects between a low power level 415, a medium power level 420, or a high power level 425. In selecting between the power levels, the slow power control 405 measures the quality of signals over a broad range of time, generally in the hundreds of millisecond range. Of course, the switch 410 is merely representative of how the slow power control 405 selects between power levels. The selection may be accomplished in a variety of manners, including running a separate subroutine for each power level, setting a flag indicating at which power level to transmit, or using a logic sequence to identify the proper power level.

The quality of signals are determined from a variety of metrics, including among others the bit error rate, the received signal strength indicator, and the signal quality. The signal quality metrics are discussed in further detail below. Because the transmission frames 304 and the receiving frames 308 are approximately one millisecond long, the slow power control 405 only switches between power levels at a minimum of every 100 data frames.

When the slow power control 405 indicates the signal level is very strong, the base station 104 instructs the mobile unit 106 to transmit the transmission frames 304 at the low power level 415. As a user walks away from a base station 104, the quality of the signal may decrease. When the average signal quality over a period of time falls below a preset threshold, the slow power control 405 in the base station 104 sets the mobile unit 106 to the medium power level 420. This increases the amount of power at which the mobile unit 106 transmits the transmission frames 304.

As the user moves yet further away from the base station 104, or atmospheric conditions degrade the signal from the mobile unit 106 to the base station 104, the average signal quality measured over a period of time may diminish below a second threshold. If the average signal quality diminishes below the second threshold, the slow power control 405 in the base station 104 directs the mobile unit 106 to the high power level 425. The mobile unit 106 then transmits the transmission frames 304 at the high power level 425.

The mobile unit 106 transmits at each power level until the average signal quality over a period of time moves above or below the thresholds. For example, the mobile unit 106 transmits at the high power level 425 until the average signal quality over a period of time improves beyond the second threshold. At this point, the slow power control 405 in the base station 104 instructs the mobile unit 106 to transmit at the medium power level 420. In one embodiment, the power levels are measured as the ratio of a quantity of power to 1 milliwatt (dBm). In an embodiment of the slow power control 405, the low power level transmits at 3 measured decibels (dBm), the medium power level 420 transmits at 7 dBm, and the high power level 425 transmits at 20 dBm.

Figure 4B:
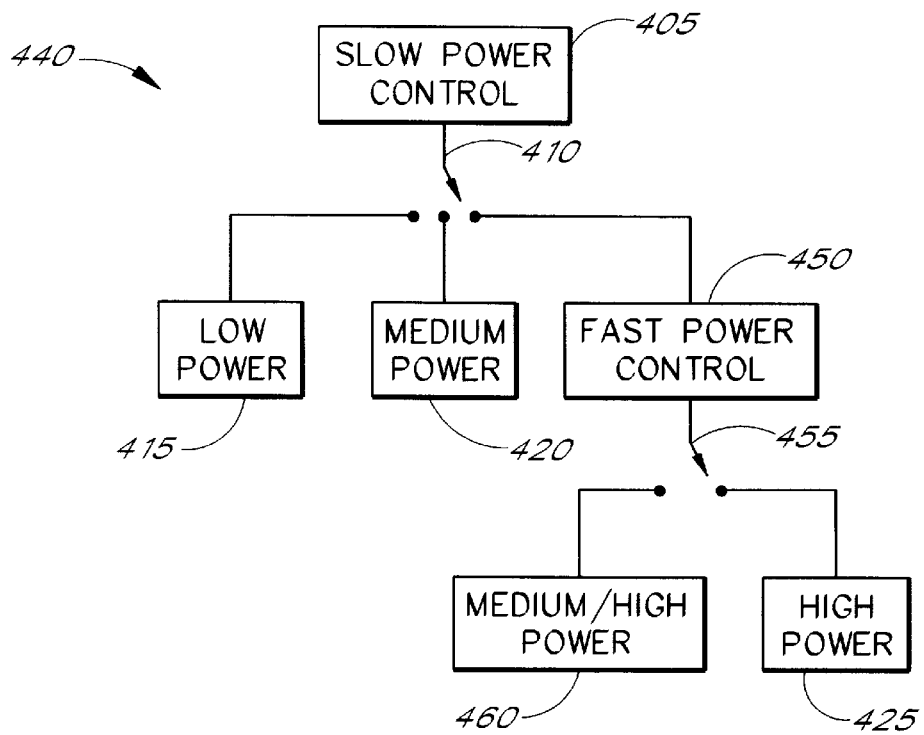
FIG. 4B illustrates a block diagram of the fast power control of one embodiment of the present invention.

FIG. 4B illustrates a block diagram 440 showing the fast power control 450 according to one embodiment of the present invention. The slow power control 405 operates with respect to the low power level 415 and the medium power level 420 in the same manner as described with reference to FIG. 4A. However, when the slow power control 405 determines the signal quality has reached the second threshold, the slow power control 405 through the switch 410 activates the fast power control 450. The fast power control 450 has a switch 455 which selects between the high power level 425 and a medium/high power level 460.

As with the switch 410, the switch 455 is merely representative of how the fast power control 450 selects between power levels. The selection may be accomplished in a variety of manners, including running a separate subroutine for each power level, setting a flag indicating at which power level to transmit, or using a logic sequence to identify the proper power level. The medium/high power level 460 is a level between the medium power level 420 and the high power level 425. In one embodiment of the invention, the medium/high power level 460 is 13 dBm.

In operation, the switch 455 of the fast power control 450 defaults to the medium/high power level 460. As will be described below in greater detail, the fast power control 450 measures the signal quality during every data frame. If, during any data frame, the signal quality falls below a preset threshold, the switch 455 of the fast power control 450 will activate the high power level 425 and instruct the mobile unit 106 to transmit at the high power level 425. After the mobile unit 106 transmits at the high power level 425, the mobile unit 106 automatically resets the switch 455 to transmit at the medium/high power level 460. Only another instruction by the fast power control 450 causes the mobile unit 106 to transmit at the high power level 425.

Figure 5:
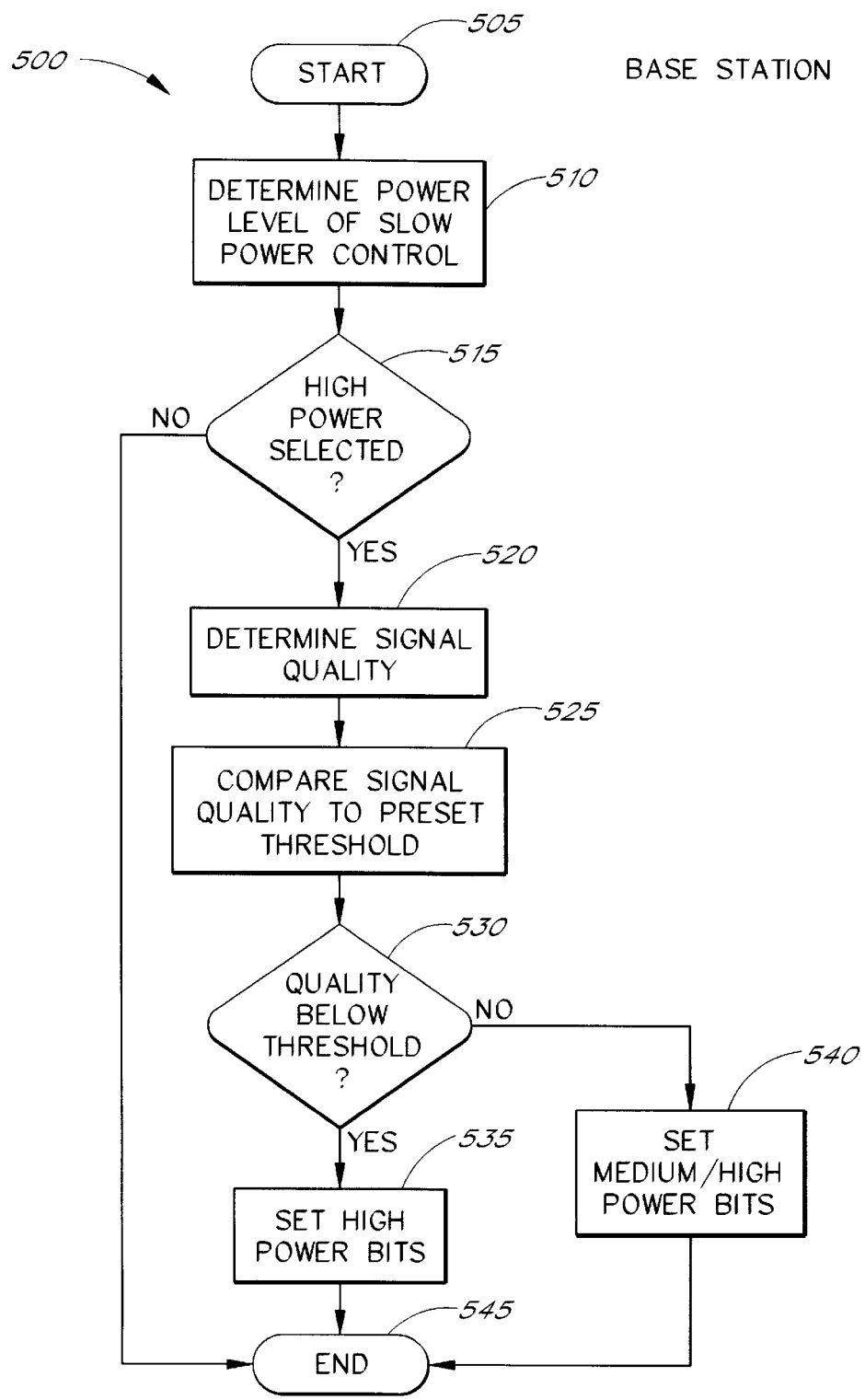
FIG. 5 illustrates acts performed by a base station to determine the transmission power required by the mobile unit.

FIG. 5 illustrates the process 500 performed by the base station 104 to set the transmission power of the mobile unit 106. The base station 104 initializes as indicated by start block 505. Proceeding to state 510, the slow power control 405 in the base station 104 directs the mobile unit 106 to operate at either the low power level 415, the medium power level 420, or the high power level 425.

Proceeding to state 515, if the slow power control 405 in the base station 104 directs the mobile unit 106 to operate at either the low power level 415 or the medium power level 420, the base station 104 proceeds along the NO branch to an end state 545.

Returning to state 515, if the high power level 425 is selected by the slow power control 405, the base station 104 proceeds along the YES branch to state 520. In state 520, the base station 104 determines the quality of the signals received from the mobile unit 106.

The base station 104 uses a variety of indicators to determine signal quality. Among these indicators is a bit error rate, a receiver quality indicator (RX Quality), a signal quality indicator, and a receive signal strength indicator (RSSI). The base station 104 uses these indicators to determine the quality of the signals received from the mobile unit 106. These indicators are well known and presently monitored by the base station 104.

In particular, the bit error rate is the number of erroneous bits in a data transmission. The RX Quality is a value assigned by the network indicating the quality of the received signal based upon the bit error rate. The RX Quality figure provides a base station 104 with an expected measurement accuracy. The base station 104 uses the RX Quality to determine the overall potential for error.

The base station 104 may also use the signal quality indicator to determine the strength of the signals received from the mobile unit 106. The signal quality indicator is an estimate of the signal to noise ratio of the received signal. The signal quality indicator is calculated from the signal received at the base station 104.

Another measurement that may be used by the base station 104 is RSSI. RSSI provides a known value based upon the measured strength of the signal at the base station 104. A strong signal at the base station 104 indicates less likelihood for error. Table 1 provides examples of potential values for RSSI based upon the signal strength received at the base station 104. Each specific value for RSSI correlates to the strength of the signal (in measured decibels (dBm)) at the base station 104.

TABLE 1

| RSSI | Level at Base Station (dBm) |
|---|---|
| 0 | Less than −110 |
| 1 | −110 to −109 |
| 2 | −109 to −108 |
| . | . |
| . | . |
| . | . |
| 62 | −49 to −48 |
| 63 | above −48 |

Using the above indications of signal quality, the base station 104 can determine the probability of receiving a usable signal if the mobile unit 106 continues transmission at the same power level. If the signal quality is poor, the mobile unit 106 must increase the transmission power level to ensure a usable signal is received by the base station 104. Any technique known to one skilled in the art to measure signal quality may be used without departing from the spirit of the invention.

Proceeding the state 525, the base station 104 compares the measured signal quality to a preset threshold. The preset threshold may vary but is generally chosen to ensure adequate reception of the signals transmitted by the mobile unit 106 to the base station 104. For example, it may be known an RSSI of less than 30 results in an unusable signal. When this RSSI is detected, the mobile unit 106 needs to boost transmission power to ensure proper reception.

To communicate with the mobile unit 106, the base station 104 constructs the receiving frame 308. As described above, the receiving frame 308 contains guard bits 312, DC settling bits 316, a decoder start bit 318, voice data bits 320, and control bits 324. The fast power control 450 information is included in the control bits 324. The base station 104 includes fast power control bits 332 in the control bits 324 of the receiving frame 308.

Proceeding the state 530, the base station 104 determines if the measured signal quality is below the preset threshold. If the signal quality is not below the threshold, the signal quality is adequate and the base station 104 proceeds along the NO branch to state 540. In state 540, the fast power control bits 332 are set to indicate the medium/high power level 460. As described above with reference to FIG. 3, this sets both of the fast power control bits 332 to 0. The base station 104 then proceeds to the end state 545.

Returning to state 530, if the signal quality is below the preset threshold, the mobile unit 106 needs to increase the transmission power. As a result, the base station 104 proceeds along the YES branch to state 535. In state 535, the base station 104 sets the fast power control bits 332 to select the high power level 425. As described above with reference to FIG. 3, the high power level 425 is selected when either of the fast power control bits 332 are set to 1. To ensure that a single bit error does not thwart an instruction to increase power, the fast power control bits 332 also sets high power if either bit 1 or bit 2 is set to 1. The base station 104 then concludes the process by proceeding to the end state 545.

Figure 6:
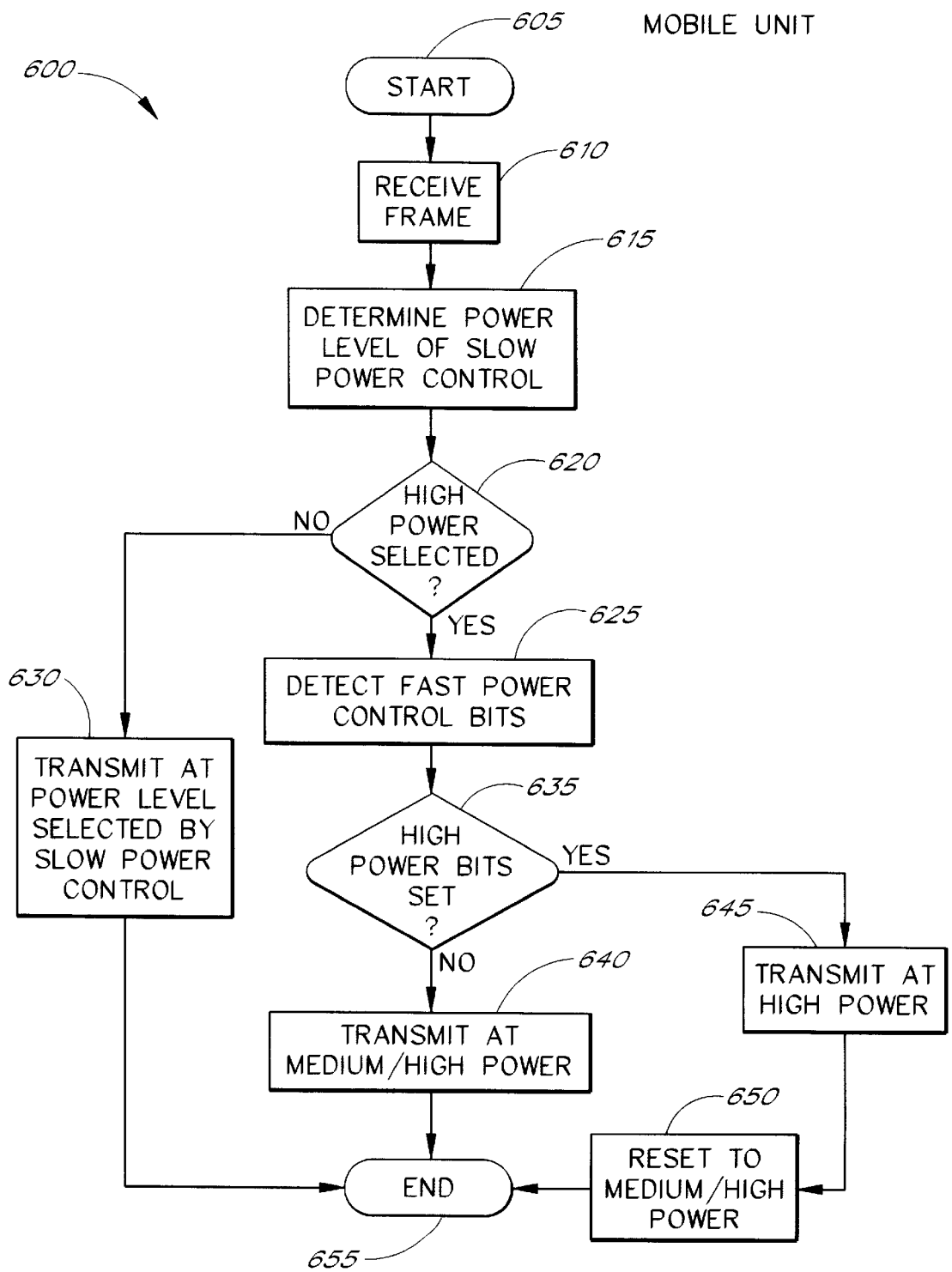
FIG. 6 illustrates acts performed by a mobile unit to determine transmission power level.

FIG. 6 illustrates a process 600 according to one embodiment used by the mobile unit 106 to determine the proper transmission power level. The process 600 begins at start state 605. Proceeding to state 610, the mobile unit 106 receives a receiving frame 308 from the base station 104. As described above with reference to FIG. 3, the receiving frame 308 contains a variety of information including guard bits 312, settling bits 316, voice data bits 320, and control bits 324.

After obtaining the receiving frames 308, the mobile unit 106 processes the information in the receiving frame 308. The codec 135 decodes the voice data bits 320 to play the voice to the user. The control bits 324 are processed by the processor in the mobile unit 106. After processing the control bits 324, the mobile unit 106 proceeds to state 615 to determine the power level selected by the slow power control 405 in the base station 104. This information is embedded in the supervisory control bits 328 as described above in FIG. 3. The slow power control 405 either selects the low power level 415, the medium power level 420, or the high power level 425.

Proceeding to state 620, the mobile unit 106 determines if the high power level 425 is selected by the slow power control 405 existing in the base station 104. If the high power level 425 is not selected, the mobile unit 106 proceeds along the NO branch to state 630. In state 630, the mobile unit 106 initializes to transmit at the power level selected by the slow power control 405. This is either the lower power level 415 or the medium power level 420. The mobile unit 106 then proceeds to an end state 655.

Returning to state 620, if the high power level 425 is selected by the slow power control 405, the mobile unit 106 proceeds along the YES branch to state 625. In state 625, the mobile unit 106 processes the fast power control bits 332. As stated above, the fast power control bits 332 have four potential settings. If both bits are set to 0, the medium/high power level 460 is selected. However, if any bit is set to 1, the high power level 425 is selected.

Proceeding to state 635, the mobile unit 106 determines if the high power level 425 is selected by the fast power control bits 332. If the fast power control bits 332 are not set to select the high power level 425, the mobile unit 106 proceeds along the NO branch to state 640. At state 640, the mobile unit 106 initializes to transmit at the medium/high power level 460. The mobile unit 106 then proceeds to the end state 655.

Returning to state 635, if the fast power control bits 332 are set to select the high power level 425, the mobile unit 106 proceeds along the YES branch to state 645. In state 645, the mobile unit 106 initializes and transmits at the high power level 425. After the transmission, the mobile unit 106 proceeds to state 650.

In state 650, the mobile unit 106 independently resets the transmission power level to the medium/high power level 460. This ensures the mobile unit 106 does not waste battery power by operating at the high power level 425 for an extended period of time, unless repeatedly instructed to do so by the base station 104. The mobile unit may reset the transmission power level following detection of any of a number of activities. Some examples include passage of a predetermined period of time, the end of a transmission of a frame or a preset number of frames, or an end of send detection. In one embodiment, the number of frames is a system parameter which can be set to a desired value. The process 600 then proceeds to the end state 655.

The mobile unit 106 performs the process shown in flowchart 600 for each of the transmission frames 304. Therefore, the fast power control 450 resets the power level to be transmitted for each of the transmission frames 304. Under the slow power control 405, the power level selected is only changed on the order of hundreds of data frames. Also, under the slow power control 405, signal qualities which exceed the second threshold automatically cause the mobile unit 106 to transmit at the high power level 425, and the medium/high power level 460 is not available.

Figure 7A:
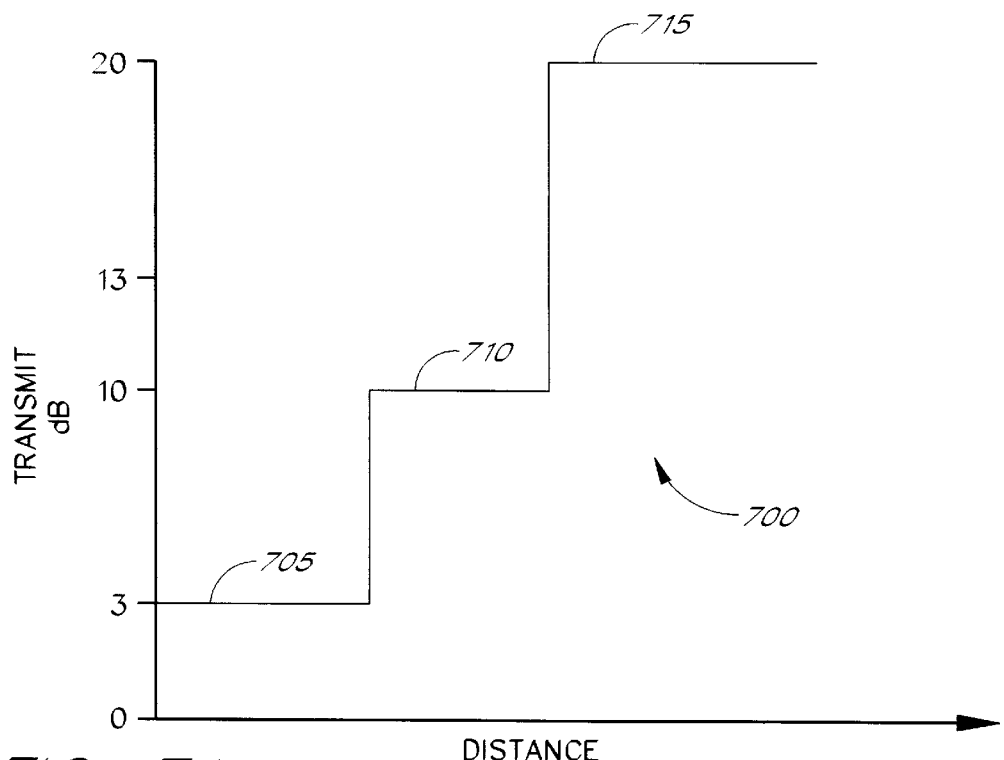
FIG. 7A illustrates an example of the transmission power levels generated by a mobile unit using the slow power control in existing wireless communication systems.

FIG. 7A illustrates an example of transmission power levels by the mobile unit 106 under the slow power control 405 system used in existing wireless communication systems. The graph 700 in FIG. 7A depicts the transmission power level in dBm, either 3, 10, or 20, corresponding to the low power level 415, the medium power level 420, and the high power level 425. The transmission power levels are charted against the distance the mobile unit 106 is from the base station 104. As can be seen by the graph 700, when the mobile unit 106 is at a distance close to the base station 104, the low power level 415 is selected and the transmission occurs at 3 dBm as indicated by section 705 of the graph 700. As the user moves further from the base station 104, the slow power control 405 activates the mobile unit 106 to transmit at the medium power level 420 and the mobile unit 106 transmits at 10 dBm as indicated by section 710 of graph 700. As the mobile unit 106 is moved yet further from the base station 104, the slow power control 405 selects the high power level 425 and the mobile unit 106 transmits at 20 dBm as indicated by the section 715 of the graph 700. Switching between the power levels can only occur on the order of hundreds of milliseconds because of the slow power control 405 switching time constraints.

Figure 7B:
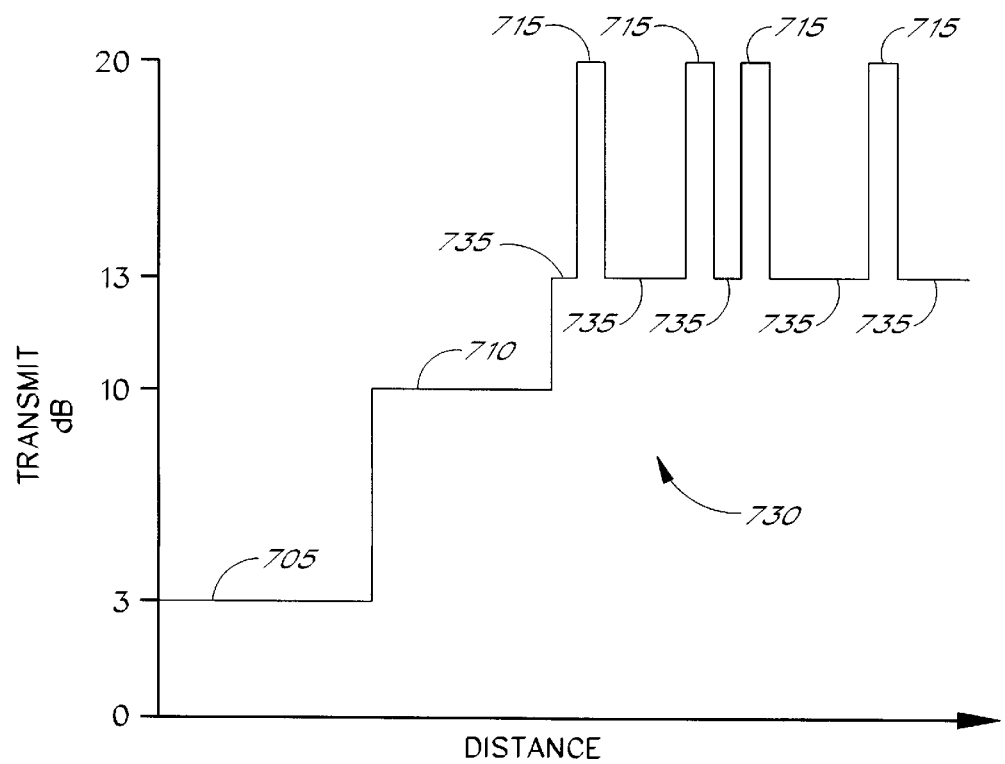
FIG. 7B illustrates an example of the transmission power levels generated by a mobile unit using the fast power control of the present invention.

FIG. 7B illustrates the transmission levels by the same mobile unit 106 with an active fast power control 450. Because, as described above, the fast power control 450 is only activated when the slow power control 405 selects the high power level 425, the graph 730 is identical for the low power level 415 and the medium power level 420 as indicated by sections 705 and 710 of graph 730. Thus, if the mobile unit 106 is close to the base station 104, the mobile unit 106 transmits at the low power level 415, and as it moves further away or the signal quality degrades, the mobile unit 106 transmits at a medium power level 420. However, when the slow power control 405 selects the high power level 425, the fast power control 450 activates causing the medium/high power level 460 to be used. In this embodiment of the invention, the medium/high power level is 13 dBm as indicated by section 735 of graph 730.

Under the fast power control 450, the mobile unit 106 reads the receiving frames 308 to determine whether to transmit at the medium/high power level 460 or the high power level 425. As described above, when the signal quality degrades below a preset threshold, the fast power control 450 switches the mobile unit 106 to transmit at a high power level 425, indicated by section 715 of the graph 730. After transmitting at the high power level 425, the fast power control 450 resets the transmission power level back to the medium/high power level 460, indicated by section 735 of the graph 730. The mobile unit 106 alternates between the medium/high power level 460 and the high power level 425 only as indicated by the fast power control 450 on a frame-by-frame basis.

Therefore, in one embodiment, the fast power control 450 causes the mobile unit 106 to automatically reset to the medium/high power level 460 independently of instructions from the base station 104. If the base station 104 then determines the signal quality of the transmission frames 304 are below an established standard, the base station 104 instructs the mobile unit 106 to increase to the high power level 425. By constantly resetting to the medium/high power level 460, the fast power control 450 ensures the mobile unit 106 only operates at the high power level 425 when necessary.

Figure 8:
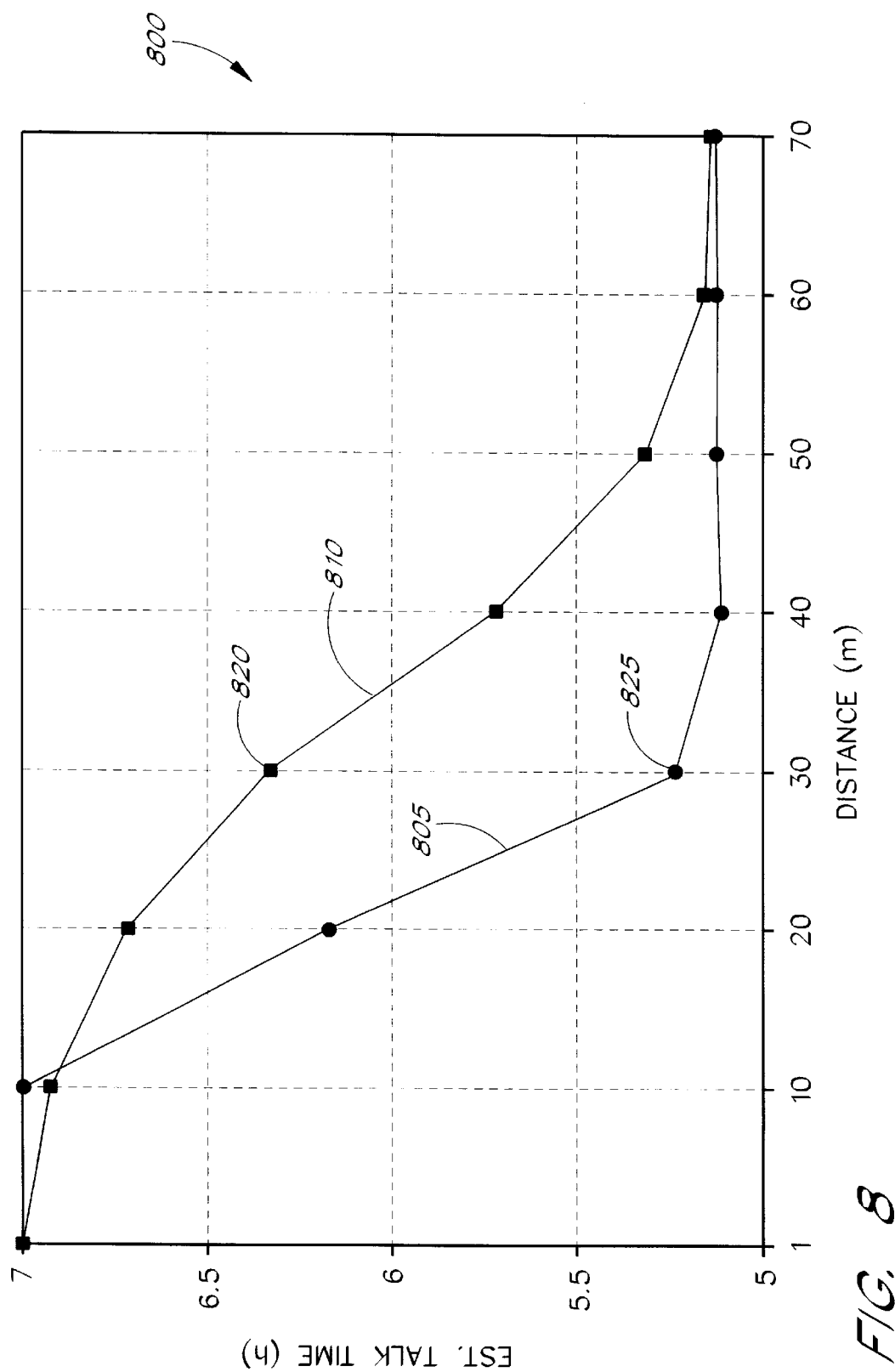
FIG. 8 illustrates a graph depicting the amount of talk time available over a range of distances using both the slow power control in existing wireless communication systems and the fast power control of the present invention.

FIG. 8 illustrates a graph 800 depicting the amount of talk time available over a range of distances for both systems having only the slow power control 405, indicated by line 805, and systems equipped with the fast power control 450, indicated by line 810. The graph 800 shows that when the mobile unit 106 is in the close proximity to the base station 104 (approximately less than ten meters in this example), the talk time of systems with and without the fast power control 450 are nearly identical. However, as the mobile unit 106 moves further from the base station 104, the amount of talk time available in the system with the fast power control 450 is greatly enhanced. This is due to the battery power saved by transmitting at the medium/high power level 460 for an extended period of time.

The power savings can be exemplified by viewing the amount of talk time available at the 30 meter point of graph 800 for both systems. The talk time available on the system having the fast power control 450 at a distance of 30 meters is approximately 6.3 hours, as indicated by a point 820 on the line 810. In the system having only the slow power control 405, the amount of talk time available at a distance of 30 meters is approximately 5.3 hours, indicated by a point 825 on the line 805 of the graph 800. Therefore, allowing the use of the medium/high power level 460 and the constant switching between the medium/high power level 460 and the high power level 425, when necessary, will conserve enough battery power in this example to increase the talk time of the mobile unit 106 approximately 1 hour before battery failure.

Numerous variations and modifications of the invention will become readily apparent to those skilled in the art. Accordingly, the invention may be embodied in other specific forms without departing from its spirit or essential characteristics. The detailed embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A wireless communication system comprising:
    a base station which transmits a first plurality of signals and receives a second plurality of signals;
    a signal strength detector in the base station which determines the quality of at least some of said second plurality of signals received by the base station, wherein when the quality is below a predetermined threshold, the base station inserts a low power indicator in at least one of said first plurality of signals transmitted by the base station; and
    a mobile unit which receives the first plurality of signals transmitted by the base station, the mobile unit configured to operate at a first power level or a second power level, the first power level being higher than the second power level, wherein when the mobile unit receives the low power indicator from the base station, the mobile unit operates at the first power level and after the transmission of a signal, the mobile unit automatically resets to operate at the second power level.

2. The wireless communication system of claim 1, wherein a processor causes the mobile unit to transmit at the second power level unless the low power indicator is present.

3. The wireless communication system of claim 1, wherein the signal strength detector measures the RSSI.

4. The wireless communication system of claim 1, wherein the signal strength detector measures the estimated frame-by-frame bit error rate.

5. The wireless communication system of claim 1, wherein the signal strength detector is based upon a parity check.

6. A wireless communication unit comprising:
    a receiver which is configured to receive a first plurality of signals, at least one of said first plurality of signals having a power level command;
    a transmitter which is configured to transmit a second plurality of signals over at least two power levels, wherein a first power level is greater than a second power level; and
    a processor connected to the receiver and the transmitter, the processor configured to control the transmitter so as to vary the power levels of the second plurality of signals, the processor further configured to select the first power level in response to the power level command and then to automatically select the second power level after the transmission of the second plurality of signals.

7. The wireless communication system of claim 6, wherein the first plurality of signals comprises a frame of data.

8. The wireless communication system of claim 6, wherein the predetermined time duration expires after each frame of data.

9. A method of conserving power in a wireless communication system comprising the acts of:
    determining the quality of a first signal received from the mobile unit;
    comparing the received signal quality to a predetermined value;
    transmitting a second signal from the mobile unit at a first power level when the received signal quality is below the predetermined value; and
    automatically resetting the mobile unit to transmit at a second power level following a transmission at a first power level, the first power level being higher than the second power level.

10. The method of claim 9, wherein the quality of signals transmitted is determined by the RX Quality.

11. The method of claim 9, wherein the quality of signals transmitted is determined by the estimated frame-by-frame bit error rate.

12. The method of claim 9, wherein the quality of signals transmitted is determined by a parity check.

13. The method of claim 9, further comprising the acts of:
    setting an indicator when the received signal quality is below the predetermined value; and transmitting a third signal having the indicator to the mobile unit.

14. The method of claim 13, wherein the indicator is set by a base station.

15. A wireless communication system comprising;
a signal strength indicator which determines the quality of a signal received from a mobile unit; and
a power level adjustor which increases the power level of a signal transmitted by the mobile unit for only a predetermined number of transmissions when the signal quality is below a set value.

16. The wireless communication system of claim 15, wherein the predetermined number of transmissions is one.

17. The wireless communication system of claim 15, wherein the signal quality is obtained from the RX Level.

18. The wireless communication system of claim 15, wherein the signal received from the mobile unit comprises a frame of data.

19. The wireless communication system of claim 18, wherein the power level adjustor resets to a lower power level after each frame of data.

20. A method of saving power in a communications system which provides for the repeated exchange of signals between a first location and a second location, the method comprising the acts of:
determining the quality of a first signal transmitted by the first location;
transmitting information instructing the first location to increase the transmission power for a second signal to a first power level if the quality of the first signal falls below a predetermined level;
automatically resetting the transmission power of the first location to a second power level after transmission of the second signal, the first power level being higher than the second power level;
determining the quality of the second signal transmitted by the first location; and
transmitting information instructing the first location to increase the transmission power for a third signal to a first power level if the quality of the second signal falls below a predetermined level.

21. The method of claim 20, wherein the first location transmits signals at the second power level when the quality of the signals received at the second location exceeds the predetermined level.

22. The method of claim 20, wherein the power level instruction information is transmitted by the second location.

23. A wireless communication system comprising;
means for determining the quality of a signal received;
means for indicating when the quality of the signal falls below a threshold; and
means for increasing the signal transmission power for only a predetermined number of transmissions when the indication means is detected so that the transmission power is automatically reset.

* * * * *